United States Patent
Wade

(10) Patent No.: US 7,503,221 B2
(45) Date of Patent: Mar. 17, 2009

(54) DUAL SPAN ABSOLUTE PRESSURE SENSE DIE

(75) Inventor: Richard A. Wade, Worthington, OH (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 11/594,589

(22) Filed: Nov. 8, 2006

(65) Prior Publication Data

US 2008/0105057 A1    May 8, 2008

(51) Int. Cl.
*G01L 9/06* (2006.01)
(52) U.S. Cl. ...................................................... 73/721
(58) Field of Classification Search ............. 73/861.71, 73/861.52; 338/4; 156/89
See application file for complete search history.

(56) References Cited

U.S. PATENT DOCUMENTS

| | | | |
|---|---|---|---|
| 4,023,562 A | 5/1977 | Hynecek et al. | |
| 4,295,115 A * | 10/1981 | Takahashi et al. | ............... 338/4 |
| 4,377,090 A * | 3/1983 | Seulen | ................... 73/861.74 |
| 4,790,192 A | 12/1988 | Knecht et al. | |
| 4,986,861 A * | 1/1991 | Nishida et al. | ........... 156/89.16 |
| 5,955,771 A | 9/1999 | Kurtz et al. | |
| 6,229,190 B1 * | 5/2001 | Bryzek et al. | ................ 257/419 |
| 6,945,120 B1 | 9/2005 | Marcus et al. | ................. 73/756 |
| 7,077,008 B2 | 7/2006 | Pham et al. | .................... 73/716 |
| 2004/0226383 A1 | 11/2004 | Romo | |
| 2006/0141608 A1 | 6/2006 | Aastrup et al. | ........... 435/287.1 |
| 2006/0144154 A1 | 7/2006 | Ueno et al. | ................... 73/723 |
| 2006/0179952 A1 | 8/2006 | Tavares et al. | ................ 73/754 |

\* cited by examiner

*Primary Examiner*—Jewel V Thompson
(74) *Attorney, Agent, or Firm*—Kermit D. Lopez; Luis M. Ortiz

(57) ABSTRACT

An absolute pressure sensor includes a sense die with a reference chamber on a top side thereof. The reference chamber comprises a precisely fabricated beam that limits the travel of a diaphragm. The beam can be positioned in a cap or cover member of the sense die, thereby allowing the sense die diaphragm to move freely for a particular distance. Over this distance, the sense die will have one sensitivity. When the sense die is pressurized to a certain point, the diaphragm moves until it contacts the beam member in the cap or cover. When the diaphragm hits the beam, the sensitivity of the sense die changes, thereby allowing a smaller voltage out for the greater pressure in. Such an arrangement permits the sensor to provide a function that accurately measures low pressure and measures a higher pressure without utilizing a linear scale.

18 Claims, 4 Drawing Sheets

DUAL SPAN ABSOLUTE PRESSURE SENSE DIE

TECHNICAL FIELD

Embodiments are generally related to sensor methods and systems. Embodiments are also related to pressure sensors. Embodiments are additionally related to exhaust back pressure sensors. Embodiments are also related to absolute pressure sensors that include dual span sense die.

BACKGROUND OF THE INVENTION

Pressure metrology is the technology of transducing pressure into an electrical quantity. Normally, a diaphragm construction is used with strain gauges either bonded to, or diffused into it, acting as resistive elements. Under the pressure-induced strain, the resistive value changes. Many micromachined absolute pressure sensors function by mounting the material removal side of a silicon sense die into glass. Such a methodology can create an absolute pressure sensor. In general, absolute pressure sensor can employ a sealed volume of gas or vacuum on one side of a diaphragm, with another side of a diaphragm being exposed to a sensed fluid.

Some pressure sensors contain one or more sensing elements formed from strain sensitive piezoresistive components, which are ion implanted into silicon. In such a configuration, four piezoresistive components may be utilized. The piezoresistors can be connected in a wheat stone bridge configuration, such that the resistance of two piezoresistors increases whereas the resistance associated with the other two piezoresistors decreases when pressure is applied to the sensor. The resistance in the arms of the bridge changes by an amount proportionate to applied pressure, which can resulting in a change to the sensor output voltage. After the piezoresistors are formed on the sensing chip, a diaphragm can be fabricated by chemically etching the silicon from the backside of the sensor. The diaphragm thickness determines the pressure range of the sensor.

In automotive EGR (Exhaust Gas Recirculation) systems that control flow with a poppet valve, there is a need for very fine control at low flow levels. One problem with the type of pressure sensors and mean value type of measuring utilized in EGR systems is that such sensors do not capture the high frequency pressure pulsations originating from the opening and closing of the exhaust and inlet valves. Another aspect of these valves is that they have to have a very specific shape for the poppet to avoid a problem called "corking", when the poppet valve gets stuck in the poppet hole. A more gradual curve could be created by poppet valve shaping, but this just leads to "corking" so they eliminate this as a possible option.

The pressure sensor, which is typically located after the poppet valve, is likely to provide less than optimal results due to turbulence that occurs after the valve and the poor physical location of the pressure sensor. The pressure reported from such a sensor is typically lower than the pressure in the intake manifold in many operating conditions, thus indicating a pressure increase over the EGR coolers, which is physically impossible. A need therefore exists for improved pressure sensor methods and systems for high accuracy measurements at low pressures and low accuracy measurements at high pressures in order to avoid pressure control problems in EGR systems.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for improved pressure sensors.

It is another aspect of the present invention to provide for an improved absolute pressure sensors that include dual span sense die.

The aforementioned aspects and other objectives and advantages can now be achieved as described herein. An absolute pressure sensor is disclosed that includes a conventional sense die with a reference chamber located on a top side thereof. The reference chamber possesses a precisely fabricated beam that limits the travel of a diaphragm. The beam is positioned in the cap or cover member of the sense die in order to allow the sense die diaphragm to move freely to a particular distance. Over this distance, the sense die preferably possess a single sensitivity. When the sense die is pressurized to a certain point, the diaphragm moves until it contacts the beam member in the cap or cover. When the diaphragm hits this beam, the sensitivity of the sense die changes, thereby permitting a smaller voltage out for the greater pressure in. This allows the sensor to provide a function that accurately measures a low pressure and measures a higher pressure without utilizing a linear scale.

The absolute pressure sensor contains sensing elements including, for example, four piezoresistors buried in the face of a thin, chemically-etched silicon diaphragm. A pressure change causes the diaphragm to flex, inducing a stress or strain on the diaphragm and the buried resistors. The resistors values change in proportion to the stress applied and produce an electrical output. By accurately locating the two sets of piezoresistors, two distinct sensitivities can be sensed, essentially providing for two sensors in a single sensor package.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

An exhaust back pressure sensor using absolute micromachined pressure sense die is disclosed herein. In such a device, an absolute pressure sensor with high isolation between the sensed media and the sensor electronics can be implemented. Such a sensor can be utilized, for example, to sense the exhaust pressure in automotive engines.

Figure 1:
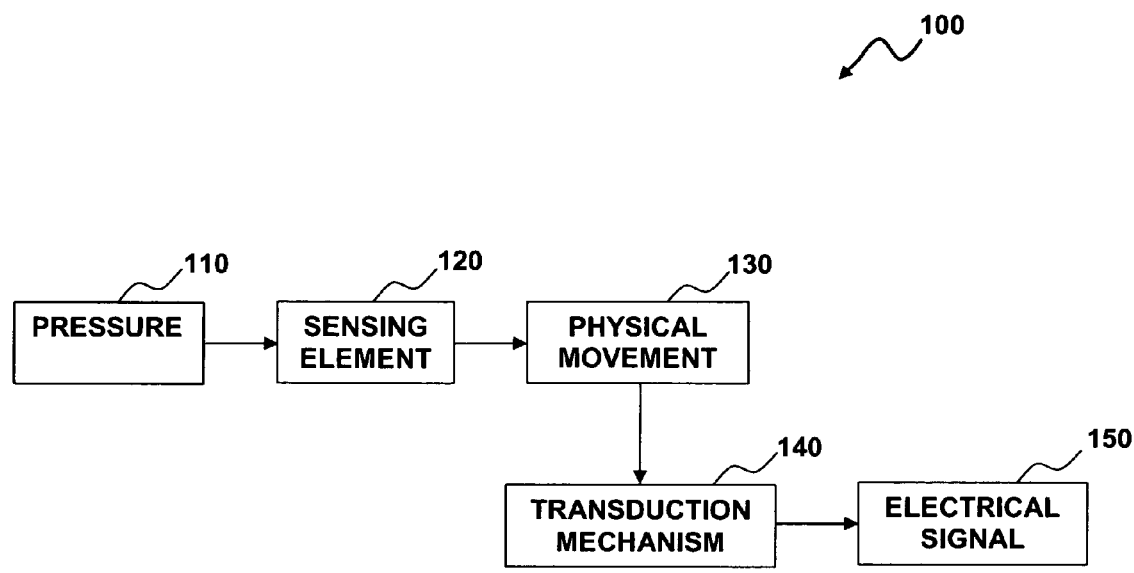
FIG. 1 illustrates a block diagram of an absolute pressure sensor system, which can be implemented in accordance with a preferred embodiment.

Referring to FIG. 1, a block diagram depicting the functioning of an absolute pressure sensor system 100 is illustrated, in accordance with a preferred embodiment. Note that in FIGS. 1-3, identical or analogous parts or elements are generally indicated by identical reference numerals. System 100 generally includes a transduction mechanism 140 that generates an electrical signal 150. System 100 further includes one or more sensing elements 120 for sensing pressure 110. The transduction mechanism 140 functions due to the physical movement 130 of the sensing element 120. The electrical signal 150 generated by the transduction mechanism 140 is proportional to the system pressure 110.

Figure 2:
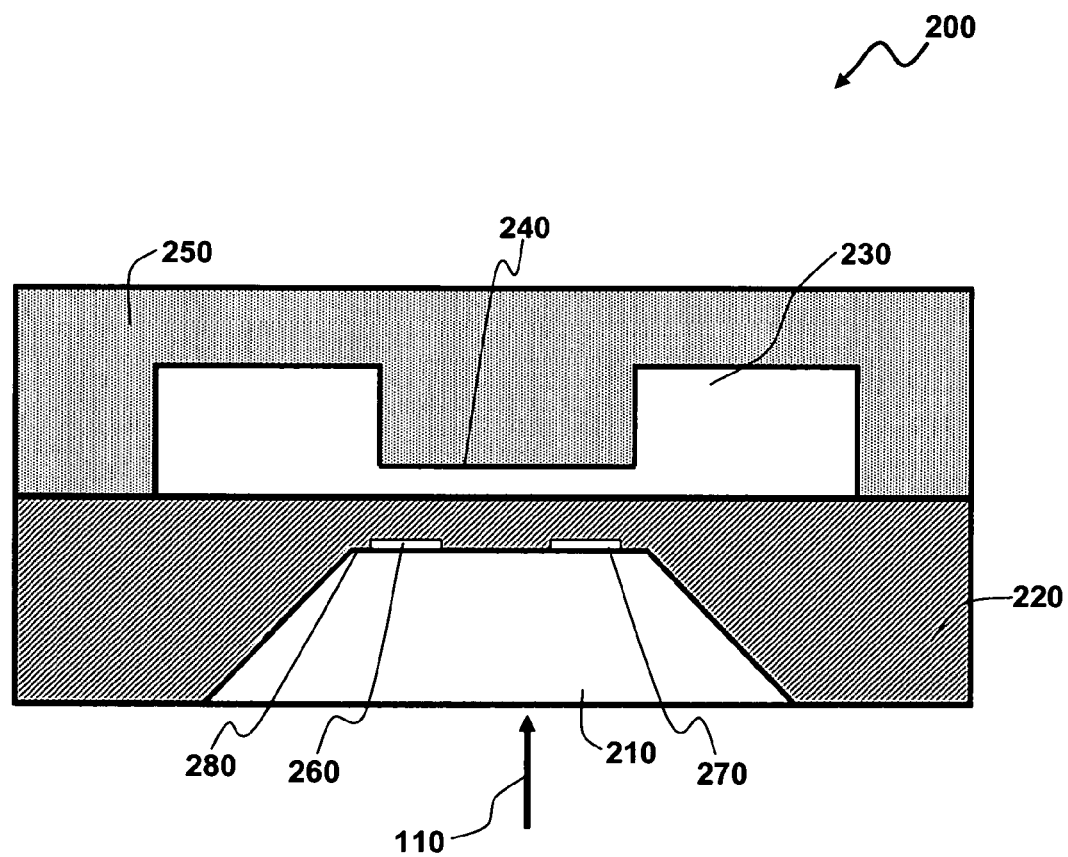
FIG. 2 illustrates a cross sectional view of an exhaust back pressure sensor system in a piezo-resistive sense die configuration, which can be implemented in accordance with a preferred embodiment.

Referring to FIG. 2 a cross sectional view of an exhaust back pressure sensor system 200 in a piezoelectric sense die configuration is illustrated, which can be implemented in accordance with a preferred embodiment. Pressure sensor 200 as depicted in FIG. 2 convert a physical value (weight, tire pressure, force, flow) into a differential signal in the mV/V range. Basically, piezo-resistive pressure sensor 200 transform a change of the physical quantity pressure 110 into a modulation of sensor's electrical signal 150. The conversion from pressure 110 into an electrical signal 150 is achieved by the deformation of a diaphragm inside the sensor 200. The pressure 110 is applied to the sensing element 120.

Sensor 200 generally includes a hermetically sealed cover 250 for absolute pressure reference and a reference pressure cavity 230 for absolute pressure sensor capabilities. Pressure sensor 200 contains a sensing element 220 that includes two sets of piezoresistors 260 and 270 buried in the face of a thin, chemically-etched silicon diaphragm 210. The reference pressure cavity 230 can be anodically bonded or hermetically bonded to the silicon sensing element 220 located above the diaphragm 210. Note that such a bonding need not be anodic, but could be based on a hermetic methodology. The pressure 110 causes the diaphragm 210 to flex, inducing a stress or strain in the diaphragm 210 and the buried resistors 260 and 270. The resistors 260 and 270 value changes in proportion to the stress applied and produce an electrical signal 150 as illustrated in FIG. 1.

The piezoresistive micromachined pressure sensor system 200 employs four implanted piezoresistors 260 and 270 in a Wheatstone bridge configuration. The piezoresistors 260 and 270 are patterned across the edges of a region 280 of the silicon diaphragm 210. This pressure deflects the diaphragm 210 upward into the reference chamber 230. The sense element 220 can provide a specific output voltage for one amount of travel and then when the diaphragm 210 hits the beam 240, provide another output. The reference chamber 230 has a precisely fabricated beam 240 which limits the travel of the diaphragm 210. Note that the reference chamber 230 may include Pyrex glass. Note that term "Pyrex" refers generally to a type of borosilicate glass introduced by Corning Glass Works. Though borosilicates had been produced before, the name "Pyrex" is widely used as a synonym for the material. Alternatively, a design can be implemented. The pressure sense die 220 and/or piezoresistors 260 and 270 can be bonded to a base of silicon via a glass paste. Such a glass paste can be cured and then used to maintain the reference chamber to the base silicon.

The beam 240 is preferably positioned in the cap or cover member of the sense die 220 such that it allows the sense die diaphragm 210 to move freely to some distance. Over this distance, the sense die 220 preferably possess a single sensitivity. When the sense die 220 is pressurized to a certain point, the diaphragm 210 will move until it contacts the beam 240 member. When the diaphragm 210 hits this beam 240, the sensitivity of the sense die 220 will change (e.g., decrease) allowing a smaller voltage out for the greater pressure 260. This arrangement permits the sensor system 200 to provide a function which accurately measures the low pressure and measures a higher pressure without using a linear scale.

Figure 3:
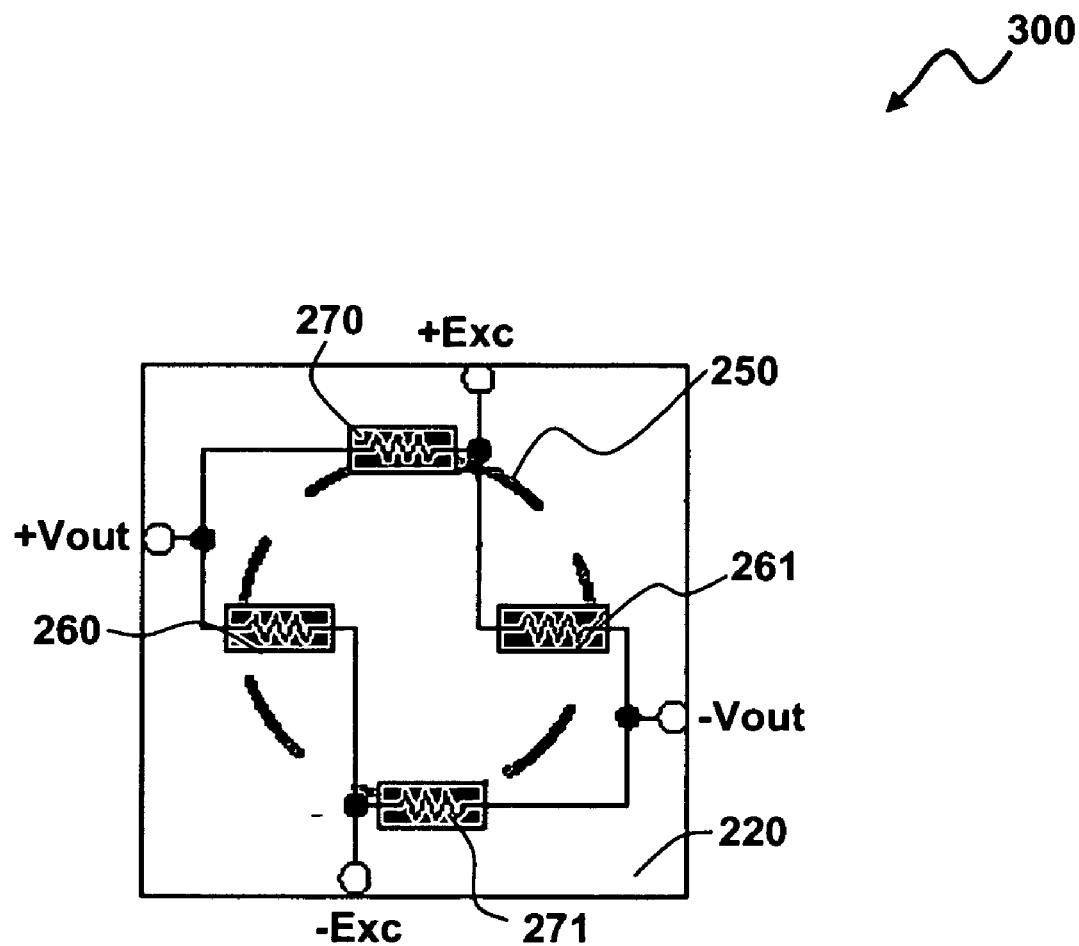
FIG. 3 illustrates a detailed view of silicon piezo-resistive sense element, in accordance with a preferred embodiment.

Referring to FIG. 3 a detailed view of a silicon piezoresistive sense element bridge 300 is illustrated, in accordance with a preferred embodiment. The piezoresistors 260, 261 and 270, 271 can be connected in a Wheatstone bridge configuration integrated into the sensor die 220 and can be located along the periphery of the pressure-sensing diaphragm 210 at locations that or appropriate for strain measurement. In general, piezo-resistivity is a material property that influences the bulk resistivity by mechanical stress. In a bridge configuration, the resistance of diagonally opposed resistors 260, 261 and 270, 271 varies equally and in the same direction, as a function of the mechanical deformation caused by pressure 250 as illustrated in FIG. 2. As the resistance of one set of diagonally opposite resistors 260, 261 increases under pressure, the resistance of the other set of resistors 270, 271 decreases, and vice versa.

Bridge excitation in the form of voltage or current can be applied across two opposite corners of the bridge 300, which is indicated as +Exc and −Exc in FIG. 3. These terminals are usually referred to as "excitation inputs" or "bridge-drive inputs". Any change in resistance (i.e., pressure 110) is detected as a voltage difference across the other two corners of the bridge as indicated by $+V_{out}$ and $-V_{out}$ in FIG. 3, which are typically referred to as the "bridge output" or the "signal output. The same equivalent circuit results from a dual-sensing-element approach, enabling the user to further condition the signals from the differential output using traditional conditioning techniques such as a single instrumentation amplifier. By accurately locating two sets of piezoresistors 260, 261 and 270, 271, two distinct sensitivities can be sensed in order to provide for two pressure sensing capabilities in a single package.

Figure 4:
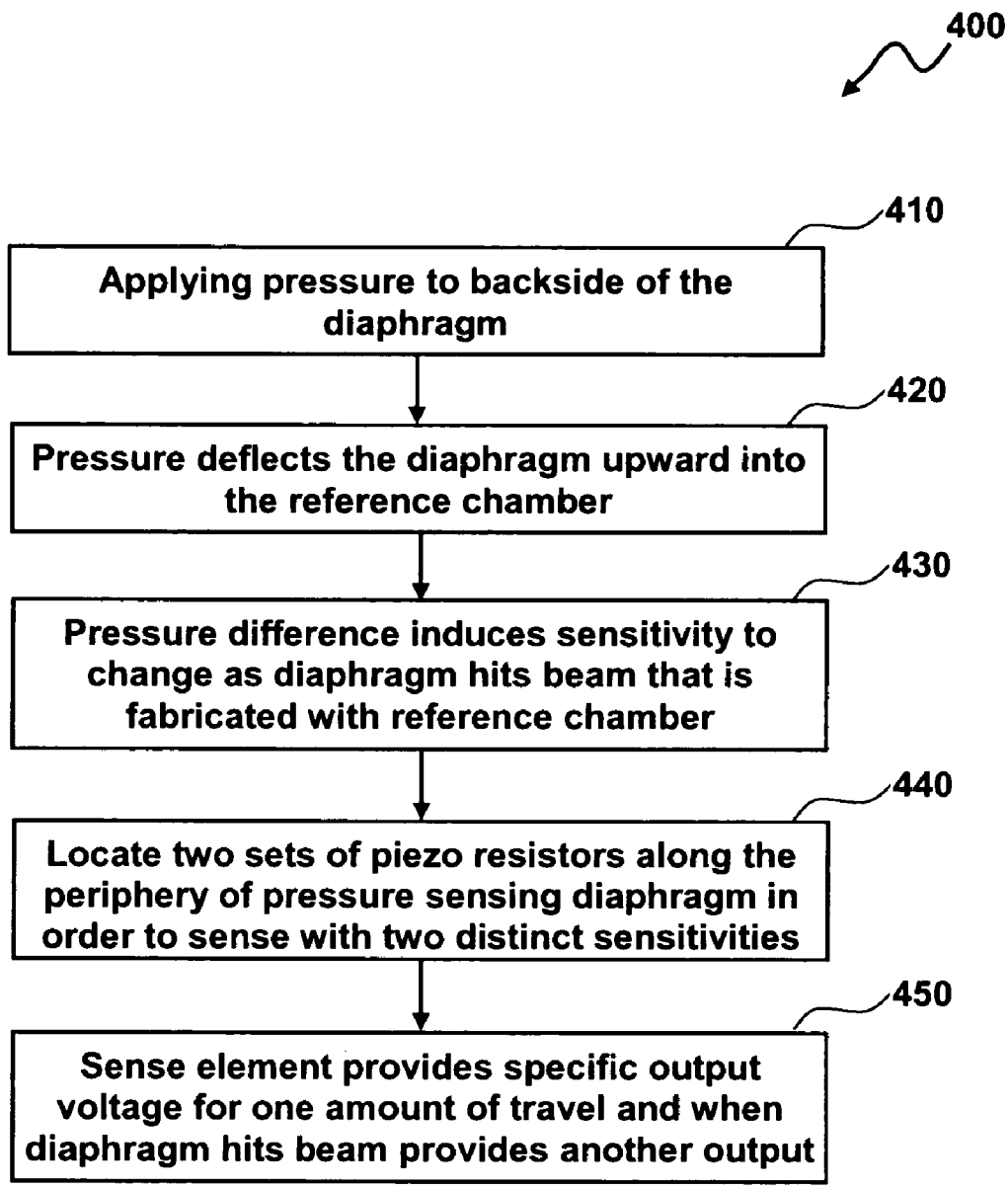
FIG. 4 illustrates a flow chart depicting logical operational steps for pressure sensing, which can be implemented in accordance with a preferred embodiment.

Referring to FIG. 4, a flow chart depicting logical operational steps of a method 400 for pressure sensing is illustrated, in accordance with a preferred embodiment. As indicated at block 410, pressure (e.g., see pressure 110 in FIG. 1) can be applied to a backside of the diaphragm 210. The applied pressure deflects the diaphragm 210 into the reference chamber 230, as illustrated at block 420. Next, as depicted at block 430, a pressure difference induces sensitivity to change as the diaphragm 210 hits a beam 240 that is fabricated with the reference chamber 230. Two sets of piezoresistors 260, 261 and 270, 271 can be located along the periphery of the pressure sensing diaphragm 210 in order to sense with two distinct sensitivities, as indicated at block 440. Thereafter, as depicted at block 450, a sense element, such as, for example, the silicon piezo-resistive sense element bridge 300, can provide a specific output voltage for one amount of travel and when the diaphragm hits a beam 240 provides another output.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An absolute pressure sensor apparatus, comprising:
a plurality of pressure sense die for detecting sensed media and a sealed cover located above a diaphragm configured from said plurality of pressure sense die;
a reference chamber located and formed between said sealed cover and said diaphragm;
a plurality of piezoresistors embedded in said diaphragm at particular locations that maximize an output of said absolute pressure sensor; and
a precisely fabricated beam located in association with said reference chamber in order to limit a movement of said diaphragm and a plurality of varying pressures wherein said plurality of varying pressures induces a change in sensitivity as said diaphragm hits said precisely fabricated beam.

2. The apparatus of claim 1 wherein said plurality of pressure sense die is micromachined from silicon.

3. The apparatus of claim 1 wherein said reference chamber is attached by an anodic bond to a top surface of said plurality of pressure sense die, thereby trapping a reference volume of gas within said reference chamber.

4. The apparatus of claim 1 wherein said reference chamber comprises borosilicate glass.

5. The apparatus of claim 1 wherein said plurality of pressure sense die is bonded to a base of silicon via a glass paste, wherein said glass paste is cured and maintains said reference chamber to said base silicon.

6. The apparatus of claim 1 wherein said plurality of pressure sense die possesses a back side and are respectively associated with a plurality of varying pressures.

7. The apparatus of claim 1 wherein said precisely fabricated beam allows said diaphragm to move freely for a particular distance.

8. The apparatus of claim 1 wherein said plurality of pressure sense die provides a specific output voltage for a particular amount of travel of said diaphragm and provides another output voltage when said diaphragm hits said precisely fabricated beam.

9. An absolute pressure sensor apparatus, comprising:
a plurality of pressure sense die for detecting sensed media and a sealed cover located above a diaphragm configured from said plurality of pressure sense die, wherein said plurality of pressure sense die is micromachined from silicon;
a reference chamber located and formed between said sealed cover and said diaphragm, wherein said reference chamber is attached by an anodic bond or a hermetic bond to a top surface of said plurality of pressure sense die, thereby trapping a reference volume of gas within said reference chamber;
a plurality of piezoresistors embedded in said diaphragm at particular locations that maximize an output of said absolute pressure sensor; and
a precisely fabricated beam located in association with said reference chamber in order to limit a movement of said diaphragm, and a plurality of varying pressures wherein said plurality of varying pressures induces a change in sensitivity as said diaphragm hits said precisely fabricated beam.

10. The apparatus of claim 9 wherein said reference chamber comprises borosilicate glass.

11. The apparatus of claim 9 wherein said plurality of pressure sense die is bonded to a base of silicon via a glass paste, wherein said glass paste is cured and maintains said reference chamber to said base silicon.

12. The apparatus of claim 9 wherein said plurality of pressure sense die possesses a back side and are respectively associated with a plurality of varying pressures.

13. The apparatus of claim 9 wherein said precisely fabricated beam allows said diaphragm to move freely for a particular distance.

14. The apparatus of claim 9 wherein said plurality of pressure sense die provides a specific output voltage for a particular amount of travel of said diaphragm and provides another output voltage when said diaphragm hits said precisely fabricated beam.

15. An absolute pressure sensor apparatus, comprising:
a plurality of pressure sense die for detecting sensed media and a sealed cover located above a diaphragm configured from said plurality of pressure sense die;
a reference chamber located and formed between said sealed cover and said diaphragm;
a plurality of piezoresistors embedded in said diaphragm at particular locations that maximize an output of said absolute pressure sensor;
a precisely fabricated beam located in association with said reference chamber in order to limit a movement of said diaphragm; and
a plurality of varying pressures wherein said plurality of varying pressures induces a change in sensitivity as said diaphragm hits said precisely fabricated beam.

16. The apparatus of claim 15 wherein:
said plurality of pressure sense die possesses a back side and are respectively associated with a plurality of varying pressures,
said precisely fabricated beam allows said diaphragm to move freely for a particular distance; and
said plurality of pressure sense die provides a specific output voltage for a particular amount of travel of said diaphragm and provides another output voltage when said diaphragm hits said precisely fabricated beam.

17. The apparatus of claim 15 wherein said plurality of pressure sense die is micromachined from silicon and wherein said reference chamber is attached by an anodic bond or hermetic seal to a top surface of said plurality of pressure sense die, thereby trapping a reference volume of gas within said reference chamber.

18. The apparatus of claim 15 wherein said plurality of pressure sense die is bonded to a base of silicon via a glass paste, wherein said glass paste is cured and maintains said reference chamber to said base silicon.

* * * * *